US010293586B2

(12) United States Patent
Passmann et al.

(10) Patent No.: US 10,293,586 B2
(45) Date of Patent: *May 21, 2019

(54) USE OF LAYER STRUCTURES IN WIND POWER PLANTS

(75) Inventors: Dirk Passmann, Oberhausen (DE); Klaus Franken, Bergisch-Gladbach (DE); Stefan Lindner, Köln (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 1024 days.

This patent is subject to a terminal disclaimer.

(21) Appl. No.: 13/514,523

(22) PCT Filed: Dec. 6, 2010

(86) PCT No.: PCT/EP2010/068992
§ 371 (c)(1),
(2), (4) Date: Jun. 7, 2012

(87) PCT Pub. No.: WO2011/069975
PCT Pub. Date: Jun. 16, 2011

(65) Prior Publication Data
US 2012/0244006 A1 Sep. 27, 2012

(30) Foreign Application Priority Data

Dec. 12, 2009 (DE) .................. 10 2009 058 101

(51) Int. Cl.
*B32B 27/40* (2006.01)
*B29D 99/00* (2010.01)
*B29L 31/08* (2006.01)

(52) U.S. Cl.
CPC .......... *B32B 27/40* (2013.01); *B29D 99/0028* (2013.01); *B29K 2875/00* (2013.01); *B29L 2031/085* (2013.01); *Y02E 10/721* (2013.01); *Y02P 70/523* (2015.11)

(58) Field of Classification Search
CPC .................................. B32B 37/14; B32B 5/22
See application file for complete search history.

(56) References Cited

U.S. PATENT DOCUMENTS

| 3,691,000 A | 9/1972 | Kalnin |
| 4,289,717 A * | 9/1981 | Bortz ....................... A47K 3/00 264/257 |
| 5,885,394 A * | 3/1999 | Scherzer et al. .............. 156/242 |
| 8,047,798 B2 * | 11/2011 | Bech ....................... F03D 1/065 416/230 |
| 2003/0185673 A1 | 10/2003 | Matsumoto et al. |
| 2005/0062203 A1 * | 3/2005 | Haas ....................... B29C 33/60 264/338 |
| 2006/0204763 A1 | 9/2006 | Hartman et al. |
| 2007/0036659 A1 | 2/2007 | Hibbard |
| 2007/0251090 A1 * | 11/2007 | Breugel .................. B29C 70/30 29/889.7 |
| 2007/0254973 A1 * | 11/2007 | Emge et al. .................. 521/170 |
| 2008/0199704 A1 * | 8/2008 | Ho ........................... B32B 7/12 428/412 |
| 2008/0257108 A1 * | 10/2008 | Leberfinger ............. C04B 26/16 75/303 |
| 2009/0209671 A1 * | 8/2009 | Emge ................. C08G 18/4072 521/98 |
| 2009/0250847 A1 * | 10/2009 | Burchardt et al. ............ 264/511 |
| 2012/0159785 A1 * | 6/2012 | Pyles .................. B29C 33/3842 29/889.7 |

FOREIGN PATENT DOCUMENTS

| CN | 1954995 A | 5/2007 |
| CN | 101402791 A | 4/2009 |
| EP | 1779997 A2 | 5/2007 |
| EP | 2148087 A2 | 1/2010 |
| JP | 2000179448 A | 6/2000 |
| JP | 2003214400 A | 7/2003 |
| JP | 2006118434 A | 5/2006 |
| JP | 2008528875 A | 7/2008 |
| WO | WO-2006082479 A1 | 8/2006 |
| WO | WO-2009118545 A1 | 10/2009 |

OTHER PUBLICATIONS

International Search Report for PCT/EP2010/068992 dated Apr. 29, 2011.

* cited by examiner

*Primary Examiner* — Richard A Edgar
*Assistant Examiner* — Michael L Sehn
(74) *Attorney, Agent, or Firm* — K&L Gates LLP

(57) ABSTRACT

The invention relates to the use of layer structures in the production of rotor blades for wind power plants, and to rotor blades for wind power plants.

9 Claims, No Drawings

USE OF LAYER STRUCTURES IN WIND POWER PLANTS

The invention relates to the use of layer structures in the production of rotor blades for wind power plants, and to rotor blades for wind power plants.

Energy from wind power is becoming increasingly important, so that wind power plants, and in particular the rotor blades and their production, are being intensively researched and developed further. Particular attention is being paid to the quality of the rotor blades that are produced, and to inexpensive production. The rotor blades known hitherto for wind power plants consist of fibre-reinforced plastics based on resins as matrix material, such as, for example, polyester resins (UP), vinyl ester resins (VE), epoxy resins (EP). The production of the blades is mainly carried out by producing a lower and an upper half of the vane in one piece. The two halves are subsequently placed together and adhesively bonded. Struts or braces are also bonded in for reinforcement.

In the production of the vane halves, fibre composites are first produced, which have to cure fully. The curing process is very time-consuming and disadvantageous for rapid overall production. The rotor blades for wind power plants made from the above-mentioned resins are conventionally produced by hand lamination, hand lamination assisted by prepreg technology, by winding processes or the vacuum-assisted infusion process. In hand lamination, a mould is first prepared by application of a release agent and optionally a gel coat to the mould surface. Multiaxial glass fabrics with unidirectional or bidirectional orientation are then placed in succession into the mould. The resin is then applied to the multiaxial fabric and pressed into the multiaxial fabric manually by rolling. This step can be repeated as often as required. In addition, braces as reinforcing material and other parts, such as, for example, lightning protection devices, can be incorporated. To this first glass-fibre-reinforced layer there are applied a so-called spacer layer, which is generally made of balsa wood or of polyvinyl chloride (PVC) or polyurethane (PUR) foam, and a second glass-fibre-reinforced layer analogous to the first. Although this process has the advantage that investment in terms of machinery is low and defects are easy to identify and correct, manufacture is too labour-intensive, as a result of which the costs of the process are very high and the long manufacturing times lead to more defects and to a high outlay in terms of quality control.

The process of hand lamination assisted by prepreg technology is carried out similarly to the simple hand lamination process. In this case, however, the so-called prepregs (prefabricated glass mats impregnated with resin) are produced outside the mould and then positioned in the rotor blade mould. Although the partial automation, in contrast to simple hand lamination, for the production of the prepregs results in improved consistency in terms of the quality of the rotors that are produced, protecting the workers from the highly volatile compounds contained in the liquid resin mixtures requires a not inconsiderable outlay (safety in the workplace, etc.).

In the resin injection process (also known as resin transfer moulding (RTM) or vacuum-assisted resin transfer moulding (VA RTM) or the "SCRIMP process" (Seemann Composites Resin Infusion Moulding Process)), the moulds are prepared by application of a release agent and optionally a gel coat. The dry fibre mats are then placed in the mould according to a precise production plan. The first layer that is inserted will subsequently form the layer of the rotor blade that is located on the outside. The spacer materials are then inserted, on which fibre mats are again placed, which then form the inner layer of the finished rotor half/rotor half-shell. The mould as a whole is then hermetically sealed with a vacuum-tight film. From the mould so prepared, the air is removed from the fibre mats and the spacer materials, before the resin is injected into the mould (space between film and mould) at different locations. Like the two processes mentioned above, this process has the disadvantage that the necessary curing time, at up to 12 hours, to demoulding of the component is very long and the productivity of the installations is thereby severely restricted.

The object of the present invention was, therefore, to provide rotor blades which do not have the above-mentioned disadvantages and, in addition, can be produced inexpensively in a shorter time.

Surprisingly, that object could be achieved by producing the rotor blades using polyurethane as plastics material instead of the above-mentioned resins. In the outer casing of the rotor blade in particular, polyurethane is used according to the invention as plastics material; the fibre layers used in the outer casing are subjected thereto.

The invention provides rotor blades for wind power plants, which rotor blades have an outer casing which consists at least partially of a layer structure having the following layers
  a) a release agent layer
  b) optionally a gel coat layer
  c) a fibre layer treated with plastics material
  d) optionally a spacer layer
  e) a fibre layer provided with plastics material
  f) optionally a plastics film
and which is characterised in that polyurethane is used as the plastics material.

The invention further provides a process for the production of the rotor blades for wind power plants according to the invention, which rotor blades have an outer casing which consists at least partially of a layer structure having the following layers
  a) a release agent layer
  b) optionally a gel coat layer
  c) a fibre layer treated with plastics material
  d) optionally a spacer layer
  e) a fibre layer provided with plastics material
  f) optionally a plastics film,
characterised in that the fibre layers are treated with a reaction mixture for producing polyurethane as plastics material.

The invention further provides the use of a layer structure in the production of rotor blades for wind power plants, wherein the layer structure has the following layers
  a) a release agent layer
  b) optionally a gel coat layer
  c) a fibre layer treated with plastics material
  d) optionally a spacer layer
  e) a fibre layer provided with plastics material
  f) optionally a plastics film
and is characterised in that polyurethane is used as the plastics material.

Silicone- or wax-containing release agents are preferably used for the release agent layer. These are known from the literature.

The gel coat layer preferably consists of polyurethane, epoxy, unsaturated polyester or vinyl resins.

There can be used as the fibre layer preferably layers of randomly oriented glass fibres, woven and multiaxial glass fabrics, cut or ground glass or mineral fibres, as well as fibre mats, fibre nonwovens and knitted fabrics based on polymer, mineral, carbon, glass or aramid fibres, and mixtures thereof, particularly preferably glass fibre mats or glass fibre nonwovens. There can be used as the spacer layer preferably plastics foams, wood or metal.

The plastics film which is optionally used can remain as a layer in the casing during production of the rotor blade or can be removed when the half of the rotor blade is demoulded. It serves in particular to seal the mould halfshell, which is provided with the above-mentioned layers, in the production process for evacuation prior to filling with the liquid resin mixture.

Polyurethane is used as the plastics material. Polyurethanes are obtainable by reaction of polyisocyanates with compounds having at least two hydrogen atoms reactive towards isocyanates. The reaction mixture of isocyanate component and compounds having at least two hydrogen atoms reactive towards isocyanates is injected into the prepared evacuated layer structure.

Suitable compounds having at least two hydrogen atoms reactive towards isocyanate are generally those which carry two or more reactive groups, such as, for example, OH groups, SH groups, NH groups, $NH_2$ groups and CH-acidic groups, in the molecule. Preferably, polyether polyols and/or polyester polyols, particularly preferably polyether polyols, are used. The polyol formulation preferably contains as polyols those which have an OH number of from 200 to 1830 mg KOH/g, preferably from 300 to 1000 mg KOH/g and particularly preferably from 350 to 500 mg KOH/g. The viscosity of the polyols is preferably ≤800 mPas (at 25° C.). Preferably, the polyols have at least 60% secondary OH groups, preferably at least 80% secondary OH groups and particularly preferably 90% secondary OH groups. Polyether polyols based on propylene oxide are particularly preferred.

There are used as the polyisocyanate component the conventional aliphatic, cycloaliphatic and in particular aromatic di- and/or poly-isocyanates. Examples of such polyisocyanates which are suitable are 1,4-butylene diisocyanate, 1,5-pentane diisocyanate, 1,6-hexamethylene diisocyanate (HDI), isophorone diisocyanate (IPDI), 2,2,4- and/or 2,4,4-trimethylhexamethylene diisocyanate, bis(4,4'-isocyanatocyclohexyl)methane or mixtures thereof with the other isomers, 1,4-cyclohexylene diisocyanate, 1,4-phenylene diisocyanate, 2,4- and/or 2,6-toluene diisocyanate (TDI), 1,5-naphthalene diisocyanate, 2,2'- and/or 2,4'- and/or 4,4'-diphenylmethane diisocyanate (MDI) and/or higher homologues (pMDI) thereof, 1,3- and/or 1,4-bis-(2-isocyanato-prop-2-yl)-benzene (TMXDI), 1,3-bis-(isocyanatomethyl) benzene (XDI). There is preferably used as the isocyanate diphenylmethane diisocyanate (MDI) and, in particular, mixtures of diphenylmethane diisocyanate and polyphenylenepolymethylene polyisocyanate (pMDI). The mixtures of diphenylmethane diisocyanate and polyphenylenepolymethylene polyisocyanate (pMDI) have a preferred monomer content of from 40 to 100 wt. %, preferably from 50 to 90 wt. %, particularly preferably from 60 to 80 wt. %. The NCO content of the polyisocyanate that is used should preferably be greater than 25 wt. %, more preferably greater than 30 wt. %, particularly preferably greater than 31.4 wt. %. Preferably, the MDI that is used should have a content of 2,2'-diphenylmethane diisocyanate and 2,4'-diphenylmethane diisocyanate together of at least 3 wt. %, preferably at least 20 wt. %, particularly preferably at least 40 wt. %. The viscosity of the isocyanate should preferably be 250 mPas (at 25° C.), more preferably 100 mPas (at 25° C.) and particularly preferably 50 mPas (at 25° C.).

In addition to the known reactive components, the polyurethane reaction mixture can preferably contain additives and added ingredients, preferably fillers, such as carbon nanotubes, barium sulfate, titanium dioxide, short glass fibres or natural fibrous or lamellar minerals, such as, for example, wollastonites or muscovites. There are preferably used as additives and added ingredients antifoams, catalysts and latent catalysts. Further known additives and added ingredients can be used if required.

Suitable polyurethane systems are in particular those which are transparent. Because a low viscosity is necessary for uniform filling of the mould in the production of larger mouldings, polyurethane systems having a viscosity of ≤5000 mPas (at 25° C.; 3 min. after mixing of the components), preferably 2000 mPas, particularly preferably 1000 mPas, are particularly suitable. The conversion ratio between isocyanate component and compounds having at least two hydrogen atoms reactive towards isocyanates is preferably so chosen that the ratio of the number of isocyanate groups to the number of groups reactive towards isocyanate in the reaction mixture is from 0.9 to 1.5, preferably from 1.0 to 1.2, particularly preferably from 1.02 to 1.1.

In a preferred embodiment, the reaction mixture of isocyanate component and compounds having at least two hydrogen atoms reactive towards isocyanates is injected at a temperature of from 20 to 80° C., particularly preferably from 25 to 40° C.

After the reaction mixture has been introduced, curing of the polyurethane can be accelerated by heating the mould. In a preferred embodiment, the injected reaction mixture of isocyanate component and compounds having at least two hydrogen atoms reactive towards isocyanates is cured at a temperature of from 40 to 160° C., preferably from 60 to 120° C., particularly preferably from 70 to 90° C.

The invention is to be explained in greater detail by means of the following examples.

EXAMPLES

Moulded bodies (sheets) were produced from various polyurethane systems and compared with a standard epoxy resin system. The sheet size was 17 cm*17 cm, with a thickness of 4 mm.

The demoulding time is the time after which the PUR test specimen can be removed from the sheet mould by hand without being deformed.

The viscosity was determined 30 minutes after mixing of the components because, in the production of larger mouldings, a low viscosity is necessary for a certain time for uniform filling of the mould.

Example 1

70 g of Baygal® K 55 (polyether polyol from Bayer MaterialScience AG; OH number: 385±15 mg KOH/g; viscosity at 25° C.: 600±50 mPas) were stirred at room temperature with 65.3 g of Baymidur® K 88 (product of Bayer MaterialScience AG; mixture of diphenylmethane diisocyanate and polyphenylenepolymethylene polyisocyanate; NCO content: 31.5±0.5 wt. %; viscosity at 25° C.: 90±20 mPas) and degassed at reduced pressure. The solution was poured into a sheet mould and stored for one hour at room temperature. The sample was then tempered at 80° C. The gelling time was about 70 minutes and the demoulding time was two hours.

The test specimen had a hardness of 76 Shore D.

The viscosity at 25° C. 30 minutes after mixing of the components was 1540 mPas.

Example 2

70 g of Baygal® K 55 (polyether polyol from Bayer MaterialScience AG; OH number: 385±15 mg KOH/g; viscosity at 25° C.: 600±50 mPas) were stirred at room temperature with 63 g of Baymidur® VP.KU 3-5009 (Bayer MaterialScience AG; mixture of diphenylmethane diisocyanate and polyphenylenepolymethylene polyisocyanate; NCO content: 31.5-33.5 wt. %; viscosity at 25° C.: 15-30 mPas) and degassed at reduced pressure. The solution was poured into a sheet mould and stored for one hour at room temperature. The sample was then tempered at 80° C. The demoulding time was two hours.

The test specimen had a hardness of 76 Shore D.

The viscosity at 25° C. 30 minutes after mixing of the components was 974 mPas.

Comparison Example 3

180 g of Larit RIM 135 (L-135i) infusion resin (product of Lange+Ritter) were stirred at room temperature with 60 g of Larit RIMH 137 curing agent (product of Lange+Ritter) and degassed at reduced pressure. The solution was poured into a sheet mould and stored for one hour at room temperature. The sample was then tempered at 80° C. The demoulding time was twelve hours.

The test specimen had a hardness of 76 Shore D.

The polyurethane system could be demoulded significantly more quickly. The quicker demoulding time of the polyurethane system permits higher productivity because the time for which the moulds are occupied can be markedly reduced and more moulded bodies can accordingly be produced.

The invention claimed is:

1. A process for the production of rotor blades for wind power plants comprising providing a layer structure, wherein the layer structure comprises
   a) a release agent layer
   b) a fiber layer treated with a polyurethane,
   c) a fiber layer provided with the polyurethane
wherein at least one of the treatment of the fiber layer b) and the providing of the fiber layer c) comprises injection of a polyurethane reaction mixture through a vacuum-assisted resin transfer moulding process into a mould comprising the fiber layer b) and the fiber layer c), and wherein the polyurethane reaction mixture has a viscosity of 5000 mPas at 25° C., 30 minutes after a mixing of the polyurethane reaction mixture.

2. Process for the production of rotor blades according to claim 1 for wind power plants, comprising providing rotor blades comprising a casing comprising the layer structure.

3. Process according to claim 2, wherein the reaction mixture comprises an isocyanate diphenylmethane diisocyanate and/or polyphenylenepolymethylene polyisocyanate having an NCO content of more than 25 wt. %.

4. Process according to claim 2, wherein the reaction mixture contains a compound having at least two hydrogen atoms reactive towards isocyanate a polyether polyol in which at least 60% of the OH groups are secondary OH groups and which has an OH number of from 200 to 1830 mg KOH/g.

5. Process according to claim 2, wherein the reaction mixture is applied to the fiber layers at a temperature of from 20 to 80° C.

6. Process according to claim 2, wherein the reaction mixture is cured at a temperature of from 40 to 160° C.

7. Process according to claim 2, wherein the reaction mixture has a viscosity of ≤5000 mPas 30 minutes after a mixing of the reaction mixture.

8. The process according to claim 2, wherein the reaction mixture comprises an isocyanate diphenylmethane diisocyanate and/or polyphenylenepolymethylene polyisocyanate having an NCO content of more than 25 wt. %, wherein the reaction mixture contains as the compound having at least two hydrogen atoms reactive towards isocyanate a polyether polyol in which at least 60% of the OH groups are secondary OH groups and which has an OH number of from 200 to 1830 mg KOH/g, and wherein the reaction mixture has a viscosity of ≤5000 mPas 30 minutes after a mixing of the reaction mixture.

9. The process according to claim 8, wherein the reaction mixture has a viscosity of ≤2000 mPas 30 minutes after the mixing of the reaction mixture.

* * * * *